(12) United States Patent
Bauer (10) Patent No.: US 9,505,288 B2
(45) Date of Patent: Nov. 29, 2016

(54) PROPORTIONAL DIRECTIONAL CONTROL VALVE, AND HYDRAULIC CIRCUIT AND HYDROPNEUMATIC SUSPENSION SYSTEM HAVING SUCH A VALVE

(71) Applicant: FSP Fluid Systems Partners Holding AG, Baar (CH)

(72) Inventor: Wolfgang Bauer, Weinheim (DE)

(73) Assignee: FSP Fluid Sytems Partners Holding AG, Baar (CH)

( * ) Notice: Subject to any disclaimer, the term of this patent is extended or adjusted under 35 U.S.C. 154(b) by 326 days.

(21) Appl. No.: 14/187,650

(22) Filed: Feb. 24, 2014

(65) Prior Publication Data

US 2014/0245732 A1 Sep. 4, 2014

(30) Foreign Application Priority Data

Mar. 1, 2013 (DE) .................. 10 2013 102 069

(51) Int. Cl.
  *F16D 31/02* (2006.01)
  *B60G 17/08* (2006.01)
  (Continued)

(52) U.S. Cl.
  CPC ............ *B60G 17/08* (2013.01); *B60G 17/056* (2013.01); *F15B 11/003* (2013.01); *F15B 11/08* (2013.01); *F15B 13/0442* (2013.01); *F16F 9/18* (2013.01); *F16F 9/50* (2013.01); *F16K 11/07* (2013.01); *F16K 31/0613* (2013.01); *B60G 2202/24* (2013.01); *F15B 11/0423* (2013.01); *F15B 13/021* (2013.01); *F15B 13/0402* (2013.01); *F15B 2013/0412* (2013.01); *F15B 2211/20546* (2013.01); *F15B 2211/30515* (2013.01); *F15B 2211/31* (2013.01); *F15B 2211/3122* (2013.01); *F15B 2211/3127* (2013.01); *F15B 2211/3144* (2013.01); *F15B 2211/6051* (2013.01);
  (Continued)

(58) Field of Classification Search
  CPC .. F15B 1/021; F15B 11/003; F15B 13/0442; F15B 13/0446; F16K 31/0613; F16K 31/1221; F16K 31/1223
  See application file for complete search history.

(56) References Cited

U.S. PATENT DOCUMENTS 3,990,583 A * 11/1976 Nishida .................. B66C 13/18
  91/420
6,644,096 B2 11/2003 Brandenburger
  (Continued)

FOREIGN PATENT DOCUMENTS

DE     197 19 076     5/2000
DE     44 23 541      2/2001
  (Continued)

*Primary Examiner* — Michael Leslie
(74) *Attorney, Agent, or Firm* — Lipsitz & McAllister, LLC (57) ABSTRACT

The invention relates to a proportional directional control valve for controlling a hydraulic consumer, having a housing with a pressure port, a tank port, and first and second working ports. A control element is movably mounted in the housing. A single actuator is provided for moving the control element, which, in dependence on its position relative to the housing, enables different flow paths between the ports. The control element, starting from a first switching position in which both working ports are connected to the tank port, is movable by the actuator via a second switching position that follows the first switching position, to a third switching position that follows the second switching position. It is possible, by moving the control element from the first switching position into the third switching position, to successively disconnect the two working ports from the tank port and connect them to the pressure port.

11 Claims, 5 Drawing Sheets

(51) Int. Cl.
*F15B 11/08* (2006.01)
*F16F 9/18* (2006.01)
*F16F 9/50* (2006.01)
*F16K 11/07* (2006.01)
*F16K 31/06* (2006.01)
*B60G 17/056* (2006.01)
*F15B 11/00* (2006.01)
*F15B 13/044* (2006.01)
*F15B 13/04* (2006.01)
*F15B 11/042* (2006.01)
*F15B 13/02* (2006.01)

(52) U.S. Cl.
CPC ... *F15B2211/6052* (2013.01); *F15B 2211/625* (2013.01); *F15B 2211/7052* (2013.01); *Y10T 137/86702* (2015.04)

(56) References Cited

U.S. PATENT DOCUMENTS

| | | |
|---|---|---|
| 6,786,492 B2 | 9/2004 | Brandenburger |
| 7,048,280 B2 | 5/2006 | Brandenburger |
| 7,059,127 B2 | 6/2006 | Bauer et al. |
| 7,219,779 B2 | 5/2007 | Bauer et al. |
| 8,096,568 B2 | 1/2012 | Huth |
| 2002/0157451 A1 | 10/2002 | Brandenburger |
| 2002/0171209 A1 | 11/2002 | Brandenburger |
| 2005/0050886 A1 | 3/2005 | Bauer et al. |
| 2005/0067239 A1 | 3/2005 | Bauer et al. |
| 2005/0258607 A1 | 11/2005 | Brandenburger |
| 2009/0051130 A1 | 2/2009 | Huth |
| 2009/0261541 A1 | 10/2009 | Huth |

FOREIGN PATENT DOCUMENTS

| | | |
|---|---|---|
| DE | 101 07 631 | 9/2002 |
| DE | 101 07 644 | 2/2005 |
| DE | 103 37 600 | 3/2005 |
| DE | 102 32 769 | 8/2005 |
| DE | 10 2004 040 636 | 2/2006 |
| DE | 10 2005 062 246 | 7/2007 |
| EP | 1 508 461 | 6/2006 |
| EP | 1 963 118 | 10/2010 |

\* cited by examiner

PROPORTIONAL DIRECTIONAL CONTROL VALVE, AND HYDRAULIC CIRCUIT AND HYDROPNEUMATIC SUSPENSION SYSTEM HAVING SUCH A VALVE

BACKGROUND OF THE INVENTION

This application claims the benefit of German patent application number 10 2013 102 069.0 filed on Mar. 1, 2013, which is incorporated herein by reference in its entirety and for all purposes.

The invention relates to a proportional directional control valve for controlling a hydraulic consumer, in particular for use in a hydropneumatic suspension system, comprising a housing that has a pressure port for feeding pressurized hydraulic fluid from a pressure medium source, a tank port for discharging hydraulic fluid to a reservoir, and a first and a second working port for connecting to the hydraulic consumer, and comprising a control element that is movably held in the housing, and an actuator for moving the control element, it being possible by means of the control element, in dependence on the position thereof relative to the housing, to enable different flow paths between the working ports and the pressure port and tank port, and the flow cross-sections of the flow paths being continuously variable in dependence on the adjustment travel of the control element.

The invention further relates to a hydraulic circuit comprising a hydraulic cylinder that has a cylinder body, in the interior of which a piston that delimits a piston chamber is disposed, and comprising a proportional directional control valve of the aforementioned kind.

In addition, the invention relates to a hydropneumatic suspension system for variable suspension loads, comprising a proportional directional control valve as described above.

In hydraulics, proportional directional control valves are used to enable or block the path for the hydraulic fluid or to change the flow direction of the hydraulic fluid. The directional control valves comprise a movable control element which, depending on its position, enables different flow paths. The flow cross-sections of the flow paths are changeable in a continuously variable manner, depending on the adjustment travel of the control element. In order for the adjustment travel not to be influenced by pressures of the hydraulic fluid which occur, the control element is configured in such a manner that the pressure forces acting on the control element in the direction of movement and counter to the direction of movement of the control element, in particular the pressure forces acting on the end faces of the control element, cancel each other out. By means of such proportional directional control valves, hydraulic consumers can be controlled, and in particular the movement of a hydraulic cylinder that has a cylinder body, in the interior of which a piston having a piston rod which protrudes from the cylinder body is disposed, can be controlled. Such hydraulic cylinders are used, for example, in hydropneumatic suspension systems that are used in particular in vehicles with variable suspension loads, for example, tractors with receiving means for attachments.

In hydropneumatic suspension systems, a hydraulic cylinder is disposed between spring-loaded and nonspring-loaded masses of the vehicle. The hydraulic cylinder comprises a piston chamber which is connected to a hydraulic accumulator and which can be acted on by pressurized hydraulic fluid, and which carries the suspension load. Moreover, the hydraulic cylinder has an annular chamber that sealingly encloses the piston rod of the hydraulic cylinder.

With increasing suspension load, hydraulic fluid is pushed out of the piston chamber into the first hydraulic accumulator so that the relative position of the spring-loaded and nonspring-loaded masses changes. The change in the relative position is detected by sensors that are connected to an electrical control unit. The electrical control unit controls a valve device in such a manner that the valve device changes its switching position and thereby feeds pressurized hydraulic fluid to the piston chamber until a predefined relative position is again reached. With decreasing suspension load, hydraulic fluid flows out of the hydraulic accumulator into the piston chamber so that the relative position of the spring-loaded and nonspring-loaded masses changes again. The change in the relative position is detected again, so that the valve device changes its switching position again and hydraulic fluid can flow out of the piston chamber.

Such valve devices for hydropneumatic suspension systems usually have either two directional control valves, each having an electromagnet as an actuator and each having two switching positions, or a single directional control valve having two electromagnets and three switching positions. A hydropneumatic suspension system having two directional control valves is known from the publication DE 101 07 631 A1. The two directional control valves each comprise a magnetic coil by means of which a control element in a housing can be moved between a first switching position and a second switching position against a resiliently elastic restoring force.

The publication DE 197 19 076 A1 describes a hydropneumatic suspension system in which a single directional control valve is provided, the control element of which can be moved from a central neutral position, in which all working ports are connected to the tank port, into a working position by activating a magnetic coil in each case. In a first working position, which, starting from the neutral position, can be reached by moving in a first actuating direction, one of the two working ports is connected to the tank port and the other working port is connected to the pressure port. In a second working position, which can be assumed by the control element by moving in a second actuating direction that is opposite to the first actuating direction, both working ports are connected to the pressure port.

SUMMARY OF THE INVENTION

It is an object of the present invention to improve a proportional directional control valve of the kind mentioned at the outset in such a manner that it allows simplified control of a hydraulic consumer, it being possible by means of the proportional directional control valve to configure in particular a hydropneumatic suspension system in a structurally simpler manner.

This object is achieved for a proportional directional control valve of the generic kind in that the directional control valve has a single actuator and that the control element, starting from a first switching position in which both working ports are connected to the tank port, is movable via a second switching position that directly follows the first switching position, into a third switching position that directly follows the second switching position, it being possible, by moving the control element from the first switching position via the second switching position into the third switching position, to successively disconnect the two working ports from the tank port and to connect them to the pressure port.

In the proportional directional control valve according to the invention, only a single actuator is used, by means of which the control element can be moved relative to the housing in a given actuating direction. The control element can assume a first switching position in which the first working port and the second working port are in flow connection with the tank port, and starting from this first switching position, the control element can be moved by the actuator in a predefined actuating direction, the control element being able to successively assume two further switching positions in which the working ports are successively disconnected from the tank port and are connected to the pressure port. The three switching positions directly follow one another. In the first switching position, the two working ports are connected to the tank port. In the second switching position, one of the two working positions is still connected to the tank port, whereas the other working port is connected to the pressure port. In the third switching position, both working ports are connected to the pressure port.

The directional control valve according to the invention thus has a structurally simple design and can be produced in a cost-effective manner. By means of a single actuator, which, starting from a first switching position, moves the control element in a predefined actuating direction, the control element can initially assume a second switching position and subsequently, by moving in the same actuating direction, can assume a third switching position without this requiring a second actuator.

In the first switching position, the two working ports are connected to the tank port. This allows a hydraulic consumer, for example a hydraulic cylinder, to be completely relieved by means of the proportional directional control valve. By activating the single actuator, the control element can be moved into a second switching position that directly follows the first switching position and in which one of the two working ports is connected to the pressure port, and the other working port is connected to the tank port. Further movement in the same direction leads the control element into a third switching position in which both working ports are connected to the pressure port. The flow paths between the working ports and the pressure port are thus successively enabled during the transition of the control element from its first switching position via its second switching position into the third switching position, the flow cross-section of the flow paths continuously changing.

During a movement of the control element in the predefined actuating direction, the flow cross-sections of the flow paths, via which the working ports are connected to the tank port, can decrease to a value of zero, this value being reached successively by the two flow paths, i.e., after exceeding different adjustment travels of the control element, and subsequently, the cross-sections of the flow paths, via which the working paths are connected to the pressure port, can increase starting from a value of zero.

The proportional directional control valve according to the invention, with a relatively short stroke of the control element and without a multiplicity of intermediate positions, allows flow paths having a given flow cross-section to be successively enabled between the working ports and the pressure port and tank port in a predefinable and reproducible manner.

The directional control valve according to the invention is particularly suitable for use in hydropneumatic suspension systems for variable suspension loads, since one of the two working ports can be connected to the piston chamber, and the other working port can be connected to the annular chamber of a suspension cylinder that is configured as a double-acting hydraulic cylinder.

As already explained, the flow cross-section of the flow paths between the working ports and the pressure port and tank port is changeable in a continuously variable manner in dependence on the adjustment travel of the control element. Starting from a first switching position in which the control element assumes a predefined position relative to the housing, the flow cross-section of the flow paths between the working ports and the pressure port and tank port can be changed in a continuously variable manner in dependence on the adjustment travel that the control element covers, starting from the first switching position. By means of the directional control valve, the continuously variable change of the flow cross-section allows control not only of the direction of movement, but also of the speed of movement of a hydraulic consumer, in particular a double-acting hydraulic cylinder. The speed of movement is controlled by means of an actuator that is used for the directional control valve according to the invention.

The control element of the directional control valve according to the invention is advantageously linearly movable.

In particular, it can be provided that the control element is configured in the form of a control piston that can be linearly displaced in a control bore of the housing by means of the actuator.

The actuator is advantageously electrically activatable. For example, it can be provided that the directional control valve according to the invention comprises an electromagnet as an actuator, by means of which the control element can be moved relative to the housing.

Alternatively or additionally, it can be provided that the actuator can be actuated hydraulically, pneumatically, mechanically or manually.

In an advantageous embodiment of the invention, the control element is successively movable into the different switching positions against a resiliently elastic restoring force, by means of the actuator. In particular, the directional control valve can comprise a restoring spring that counteracts an actuating force of the actuator. It can be provided that the directional control valve has only a single restoring spring which is advantageously disposed on the side of the control element facing away from the actuator.

As already mentioned, it is advantageous when the control element is configured as a control piston that can be linearly displaced in a control bore of the housing by means of the actuator. The control piston can comprise a plurality of grooves which are disposed offset with respect to one another in the axial direction and which interact with valve chambers that are in flow connection with a pressure port, tank port or working port.

As already mentioned, the directional control valve according to the invention is suitable for controlling a hydraulic cylinder. The invention therefore further relates to a hydraulic circuit having this type of hydraulic cylinder which has a cylinder body with an interior in which a piston is disposed, the piston delimiting a piston chamber. In order to be able to control the hydraulic cylinder in a structurally simple manner, the hydraulic circuit has a proportional directional control valve of the kind explained above, the first working port of the proportional directional control valve being in flow connection with the piston chamber via a working line, and a check valve being connected into the working line, which valve opens in the direction toward the piston chamber and can be released in dependence on the pressure prevailing at the second working port of the proportional directional control valve.

The check valve is preferably hydraulically releasable.

When the proportional directional control valve is in its first switching position, both working ports are connected to the tank port and thus are relieved of pressure, and the check valve assumes its closed position so that no hydraulic fluid can escape from the piston chamber. When the proportional directional control valve is in its second switching position, the first working port remains connected to the tank port; however, the second working port is in flow connection with the pressure port so that pressurized hydraulic fluid is applied to the second working port. As a result of the pressure applied to the second working port, the releasable check valve opens and thereby enables the flow connection from the piston chamber to the tank via the working line, the first working port and the tank port. As a result, in the second switching position of the proportional directional control valve, hydraulic fluid can flow out of the piston chamber, and the hydraulic cylinder can undergo a retracting movement upon pressurization of the piston. When the proportional directional control valve is in its third switching position, the first working port is also connected to the pressure port, and pressurized hydraulic fluid can be fed to the piston chamber from a pressure medium source via the pressure port, the first working port and the working line. As a result, the hydraulic cylinder can undergo an extending movement.

The above-explained hydraulic circuit thus allows the hydraulic cylinder to be retracted and extended in a cost-effective manner at a predefinable speed, it being necessary to activate only one activator for the control.

In a particularly advantageous embodiment, the hydraulic circuit has as a pressure medium source a load-sensing supply system that is in flow connection with the pressure port of the proportional directional control valve, and upstream from the releasable check valve, a valve is connected into the working line, which valve, in dependence on the flow direction of the hydraulic fluid in the working line, enables or interrupts a flow connection between the working line and a control input of the load-sensing supply system. The load-sensing supply system, for example a load-sensing pump or a fixed displacement pump having an unloader circuit, supplies pressurized hydraulic fluid to the pressure port of the proportional directional control valve. The delivery rate of the load-sensing supply system depends on the pressure prevailing at its control input. The control input is in flow connection with a region of the working line upstream from the releasable check valve, the flow connection being enabled or interrupted by a valve, depending on the flow direction in the working line. This makes it possible to connect the control input of the load-sensing supply system to the working line and to act on it with the pressure prevailing in the working line only when the hydraulic fluid in the working line flows from the first working port to the releasable check valve, and via this check valve to the piston chamber. The delivery rate of the load-sensing supply system can then be adapted to the particular demand of the piston chamber. However, if the hydraulic fluid flows out of the piston chamber and therefore from the releasable check valve to the first working port and from there via the tank port to the tank, a pressure-dependent delivery rate of the load-sensing supply system is not required, and the flow connection between the working line and the control input of the load-sensing supply system can be interrupted by means of the valve, which is dependent on the flow direction in the working line. In the absence of pressure load at its control input, the load-sensing system then transitions into a standby mode with a minimum delivery rate. In this manner, energy consumption and noise levels of the load-sensing supply system can be kept low.

The proportional directional control valve according to the invention in particular allows a hydropneumatic suspension system to be configured for variable suspension loads in a structurally simple manner. A hydropneumatic suspension system according to the invention comprises a hydraulic cylinder that has a cylinder body, the interior of which is divided into a piston chamber and an annular chamber by a piston having a piston rod that protrudes from the cylinder body. Moreover, the hydropneumatic suspension system according to the invention comprises at least one first hydraulic accumulator that is connected to the piston chamber and at least one second hydraulic accumulator that is connected to the annular chamber, as well as a proportional directional control valve of the aforementioned kind, the first working port of the proportional directional control valve being in flow connection with the piston chamber via a first working line, and the second working port of the proportional directional control valve being in flow connection with the annular chamber via a second working line, and a first releasable check valve that opens in the direction toward the piston chamber being connected into the first working line, and a second releasable check valve that opens in the direction toward the annular chamber being connected into the second working line.

The hydraulic cylinder forms a suspension cylinder that can be positioned between spring-loaded and nonspring-loaded masses, for example, of a vehicle or also a stationary machine. The relative position between the spring-loaded and nonspring-loaded masses can be changed by selectively raising and lowering the suspension cylinder. The use of the proportional directional control valve according to the invention allows a very simple structural configuration of the hydropneumatic suspension system, whereby controlling only one actuator is sufficient for selectively carrying out a raising or lowering movement of the suspension cylinder. The check valves connected into the working lines ensure that hydraulic fluid cannot unintentionally drain off from the piston chamber or the annular chamber. However, such draining of hydraulic fluid can be achieved, if required, by releasing the check valves.

It can be provided that at least one of the check valves is electrically releasable. For this purpose, the check valve can have an electrical control input that can be acted on by an electrical signal from an electrical control unit.

It is advantageous when at least one of the check valves is hydraulically releasable. Preferably, the first and the second check valves are hydraulically releasable.

In a preferred embodiment of the hydropneumatic suspension system, the first releasable check valve is releasable in dependence on the pressure prevailing at the second working port. This makes it possible to release the first check valve in that the proportional directional control valve assumes its second switching position in which the second working port is acted on by the pressure prevailing at the pressure port and in which the first working port is connected to the tank port. The releasable check valve thus enables a flow connection from the piston chamber of the suspension cylinder to the tank via the first working line, the first working port, and the tank port, so that hydraulic fluid can escape from the piston chamber in the second switching position of the proportional directional control valve.

Instead of the releasable check valve, which may or may not be pressure-relieved, a hydraulically controllable pressure relief valve can also be used. Such valves are known to the person skilled in the art as "load holding valves" or "lowering brake valves."

It is advantageous for the second releasable check valve to be releasable in dependence on the pressure prevailing at the second working port of the proportional directional control valve.

BRIEF DESCRIPTION OF THE DRAWINGS

The following description of preferred embodiments of the invention in conjunction with the drawing provides a more detailed explanation. In the figures.

DETAILED DESCRIPTION

Figure 1:
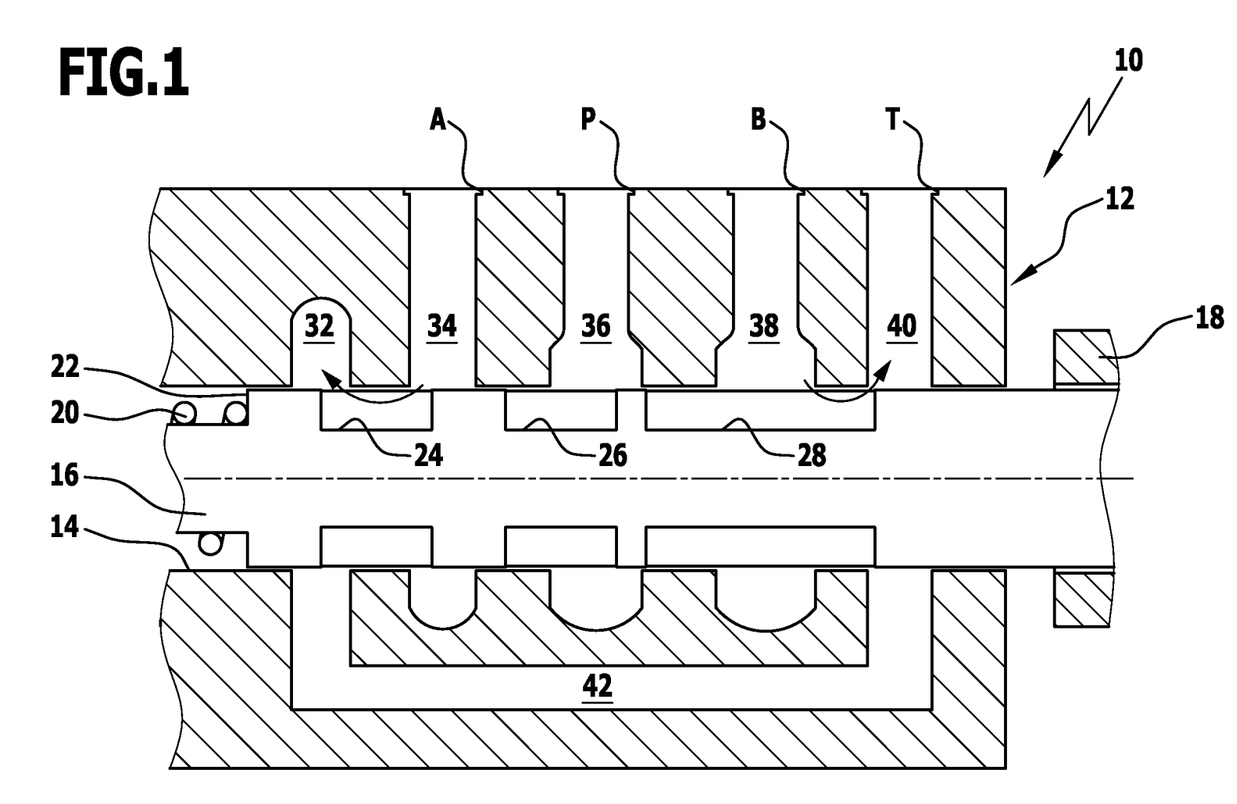
FIG. 1 shows a schematic partial view of a proportional directional control valve according to the invention, with a control piston that is in a first relative position with respect to a housing.

FIG. 1 schematically illustrates an advantageous embodiment of a proportional directional control valve according to the invention, which is designated overall by reference numeral 10. The proportional directional control valve comprises a housing 12 with a control bore 14 in which a control element in the form of a control piston 16 is mounted so as to be linearly displaceable. The control piston 16 interacts with an actuator which, in the illustrated exemplary embodiment, is configured in the form of a magnetic coil 18 by means of which the control piston 16 can be displaced in the control bore 14 against the action of a restoring spring 20. The restoring spring 20 on one side rests against a step 22 of the control piston 16 which faces away from the magnetic coil 18, and on the other side rests against a support surface (not illustrated in the drawing) of the housing 12.

The control piston 16 has a plurality of grooves 24, 26 and 28, extending in the longitudinal direction, which are disposed at an axial distance from one another and which interact with valve chambers 32, 34, 36, 38 and 40, which are formed into the housing 12 at a distance from one another and which encircle the control piston 16 in the peripheral direction.

A first valve chamber 32 is in flow connection, via a connecting channel 42, with a fifth valve chamber 40, which in turn is in flow connection with a tank port of the proportional directional control valve 10. The tank port is designated by the letter T in the drawing.

A second valve chamber 34 is in flow connection with a first working port A, to which a hydraulic consumer can be connected.

A third valve chamber 36 is in flow connection with a pressure port P of the directional control valve 10. A pressure medium source can be connected to the pressure port P.

A fourth valve chamber 38 is in flow connection with a second working port B of the directional control valve 10. Likewise, a hydraulic consumer can be connected to the second working port B.

Depending on the relative position of the control piston 16 in the control bore 1, different flow paths between the working ports A and B and the pressure port P and the tank port T are enabled. In the de-energized state of the magnetic coil 18, the control piston 16 assumes its relative position schematically illustrated in FIG. 1. In this position, the first groove 24 occupies a position between the first valve chamber 32 and the second valve chamber 34, so that the first working port A is in flow connection with the tank port T via the second valve chamber 34, the first groove 24, the first valve chamber 32, the connecting channel 42 and the fifth valve chamber 40.

In the relative position of the control piston 16 illustrated in FIG. 1, the third groove 30 occupies a position between the fourth valve chamber 38 and the fifth valve chamber 40, so that the second working port B likewise is in flow connection with the tank port T via the fourth valve chamber 38, the third groove 30, and the fifth valve chamber 40.

In contrast to the tank port T, the pressure port P in the relative position illustrated in FIG. 1 is not in flow connection with the first working port A or with the second working port B.

Figure 2:
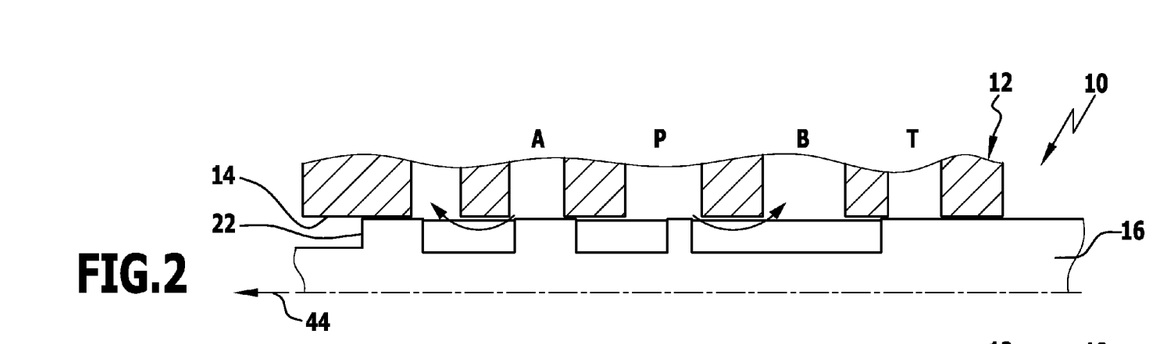
FIG. 2 shows a partial sectional view of the proportional directional control valve from FIG. 1, the control piston being in a second relative position.
Figure 3:
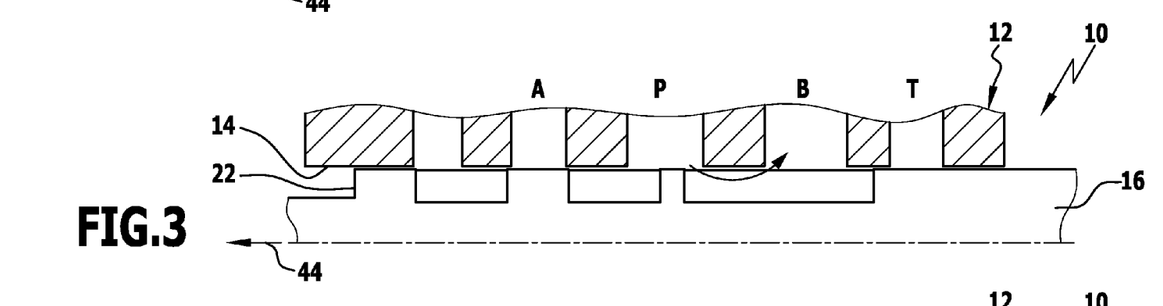
FIG. 3 shows a partial sectional view of the proportional directional control valve from FIG. 1, the control piston being in a third relative position.
Figure 4:
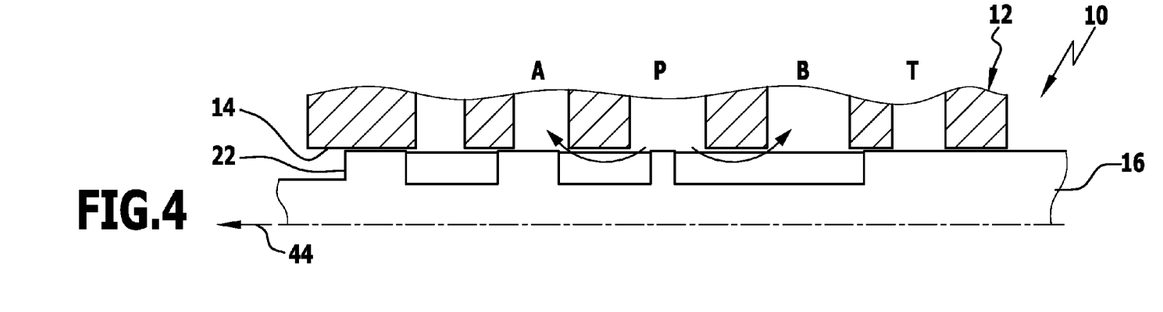
FIG. 4 shows a partial sectional view of the proportional directional control valve from FIG. 1, the control piston being in a fourth relative position.

If the control piston 16, when activated electrically by the magnetic coil 18, is moved a first distance against the resiliently elastic restoring force of the restoring spring 20 in the actuating direction 44 illustrated by the arrow 44 in FIGS. 2, 3 and 4, the flow connection between the first working port A and the tank port T is maintained; however, the flow connection between the second working port B and the tank port T is interrupted. Instead, the flow connection between the pressure port P and the second working port B is enabled, as illustrated in FIG. 2.

If the control piston 16 is further moved in the actuating direction 44 by the magnetic coil 18, the flow connection between the first working port A and the tank port T is interrupted; however, the flow connection between the pressure port P and the second working port B is maintained, as illustrated in FIG. 3.

As the result of a further movement of the control piston 16 in the actuating direction 44, the pressure port P is in flow connection with the first working port A as well as the second working port B, whereas the tank port T is disconnected from the working ports A and B, as illustrated in FIG. 4.

Thus, by a linear movement of the control piston 16 in the actuating direction 44, the two working ports A and B, starting from a first switching position in which both working ports are in flow connection with the tank port T, can be successively disconnected from the tank port T and can be connected to the pressure port P. The flow cross-section of the respective flow paths between the working ports A and B and the pressure port P and the tank port T changes in a continuously variable manner in dependence on the adjustment travel that is covered by the control piston 16 in the actuating direction 44, starting from its relative position illustrated in FIG. 1.

Figure 5:
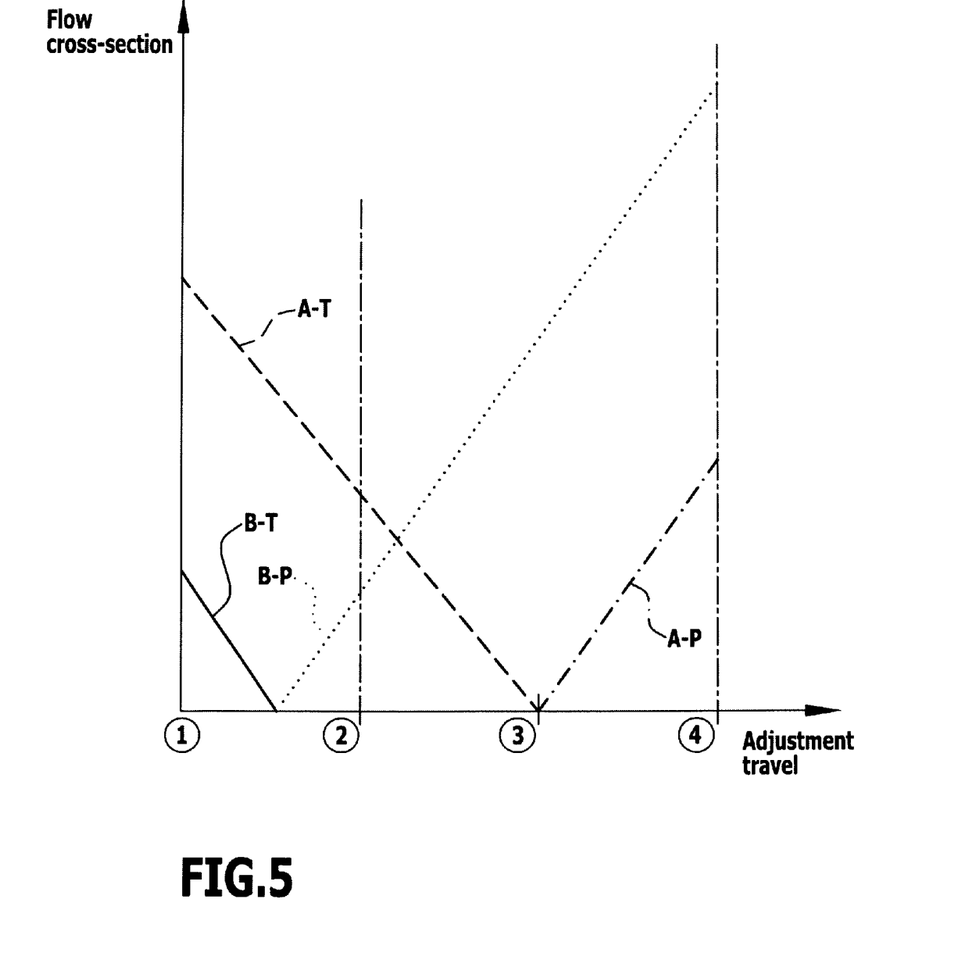
FIG. 5 shows a simplified flow rate characteristic of the proportional directional control valve from FIG. 1.

The flow rate characteristic of the proportional directional control valve 10, that is, the variation of the flow cross-section of the various flow paths in dependence on the adjustment travel of the control piston 16, is schematically illustrated in FIG. 5. FIG. 5 shows a coordinate system in which the adjustment travel of the control piston 16 is plotted on the X axis, and the flow cross-section of the various flow paths is plotted on the Y axis. The positions of the control piston 16 relative to the housing 12, illustrated in FIGS. 1 to 4, are illustrated in FIG. 5 by the encircled numerals 1, 2, 3 and 4. The range between the positions 2 and 4 is to be regarded as the main working range of the proportional directional control valve 10.

A solid line B-T in FIG. 5 illustrates the progression of the flow cross-section of the flow path between the second working port B and the tank port T. The solid line B-T is followed by a dotted line B-P which illustrates the progression of the flow cross-section of the flow path between the second working port B and the pressure port P. A dashed line A-T illustrates the progression of the flow cross-section of the flow path between the first working port A and the tank port T, and the dashed line A-T in FIG. 5 is followed by a dotted-dashed line A-P which illustrates the progression of the flow cross-section of the flow path between the first working port A and the pressure port P as a function of the adjustment travel of the control piston 16.

As is apparent from FIG. 5, a movement of the control piston 16 in the actuating direction 44, starting from the relative position illustrated in FIG. 1, results in the second working port B initially being disconnected from the tank port T and being connected to the pressure port P after a first adjustment travel is exceeded, and the first working port A also being disconnected from the tank port T and being connected to the pressure port P after a further adjustment travel is exceeded. Further movement of the control piston 16 then results in a continuous increase in the flow cross-section of the flow paths. Starting from a first switching position in which both working ports A and B are in flow connection with the tank port T, the second working port B and subsequently also the first working port A are thus initially connected to the pressure port P. A first switching position of the proportional directional control valve 10 thus corresponds to a neutral position in which both working ports A and B are unpressurized. In a second switching position of the proportional directional control valve 10, the first working port A is still connected to the tank port T, whereas the second working port B is already in flow connection with the pressure port P, and in a third switching position, both working ports A and B are connected to the pressure port P.

Figure 6:
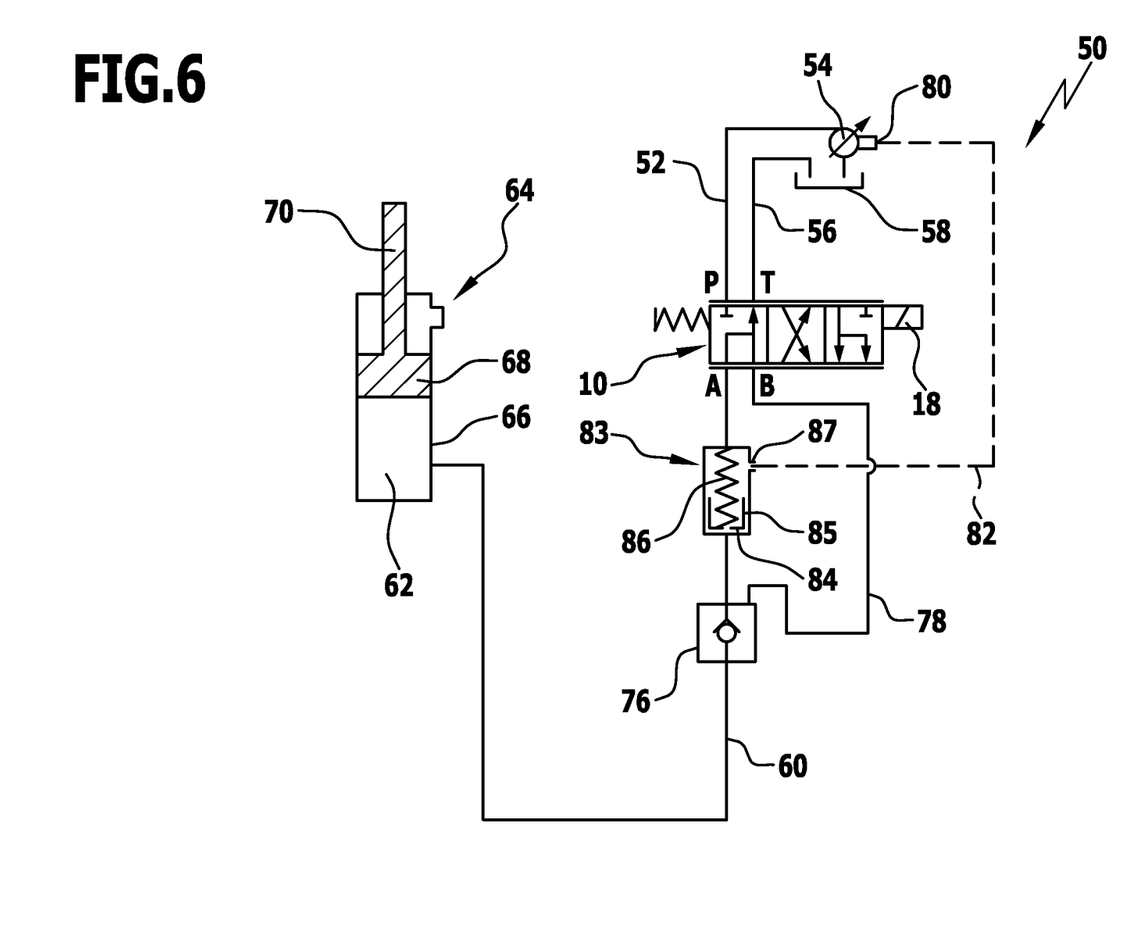
FIG. 6 shows a circuit diagram of a hydraulic circuit according to the invention, with a hydraulic cylinder and a proportional directional control valve according to FIG. 1.

The proportional directional control valve 10 is used in particular for controlling a hydraulic cylinder. To this end, FIG. 6 schematically illustrates a hydraulic circuit 50 in which the pressure port P of the proportional directional control valve 10 is connected to a load-sensing supply system, in the illustrated exemplary embodiment, a load-sensing pump 54, via a pressure supply line 52. The tank port T of the proportional directional control valve 10 is connected to a reservoir 58 via a return line 56.

In the hydraulic circuit illustrated in FIG. 6, the first working port A of the proportional directional control valve 10 is connected to a piston chamber 62 of a hydraulic cylinder 64 via a working line 60. The hydraulic cylinder 64 has a cylinder body 66, in the interior of which a piston 68 having a piston rod 70 which protrudes from the cylinder body 66 is disposed. The piston 68 delimits the piston chamber 62.

A check valve 76 which opens in the direction toward the piston chamber 62 and which is hydraulically releasable is connected into the working line 60. For releasing, the check valve 76 is connected to the second working port B via a valve control line 78.

The load-sensing pump 54 has a control port 80 that is connected to the working line 60 upstream from the check valve 76 via a pump control line 82. The connection of the pump control line 82 to the working line 60 is established via a valve 83 which is connected into the working line 60 and which enables the flow connection between the working line 60 and the control port 80 in dependence on the flow direction of the hydraulic fluid in the working line 60. For this purpose, the valve 83 in the illustrated exemplary embodiment has a diaphragm 84 that is displaceable in a valve housing and to which a cylindrical sleeve 85 is connected. The hydraulic fluid flows through the valve housing. When the hydraulic fluid flows from the first working port A to the check valve 76, the diaphragm 84, supported by a spring 86, is displaced in the flow direction until the sleeve 85 uncovers a valve port 87 for the pump control line 82, so that the working line 60 is in flow connection with the control port 80 via the pump control line 82. However, if the hydraulic fluid flows from the check valve 76 to the first working port A, the diaphragm 84 together with the sleeve 85 is displaced against the action of the spring 86 into a position in which the sleeve 85 closes the valve port 87, so that the flow connection from the working line 60 to the control port 80 is interrupted.

For retracting and extending the piston rod 70, the magnetic coil 18 of the directional control valve 10 can be acted on with electric current by an electrical control unit that is known per se and therefore not illustrated in the drawing.

In the de-energized state of the magnetic coil 18, the proportional directional control valve 10 is in a first switching position in which both working ports A and B are connected to the tank, and the check valve 76 is in its closed position.

When the control piston 16 is moved by the magnetic coil 18 into a second switching position, the flow connection between the first working port A and the tank 58 is still maintained; however, the second working port B is connected to the pressure port P. As a result, the check valve 76 is acted on with pressure via the valve control line 78 and thereby opens. Hydraulic fluid located in the piston chamber 62 can now drain to the reservoir 58 via the working line 60, the check valve 76 and the first working port A. As a result, the hydraulic piston 64 can carry out a retracting movement, the speed of which can be adjusted via the flow cross-section of the flow path between the first working port A and the tank port T, and therefore via the force exerted by the magnetic coil 18. The control port 80 is thus disconnected from the working line 60, so that the load-sensing pump 54 runs in standby mode with relatively low energy consumption and low noise levels.

When the control piston 16 is moved in the actuating direction 44 from its second switching position into its third switching position, the first working port A is now also in flow connection with the pressure port P, so that hydraulic fluid can be fed to the piston chamber 62 via the working line 60. As a result, the hydraulic piston 64 undergoes an extending movement, the speed of which can be adjusted via the flow cross-section of the flow path between the first working port A and the pressure port P, and therefore via the force exerted by the magnetic coil 18. At the same time, the flow connection between the working line 60 and the control port 80 is enabled, so that the control port 80 is acted on by the pressure that prevails in the working line upstream from the check valve 76, and the load-sensing pump 54 thus increases its delivery rate.

By means of the magnetic coil 18, it is thus easily possible to control a speed-adjustable retracting movement and extending movement of the piston rod 70 of the hydraulic cylinder 64.

Figure 7:
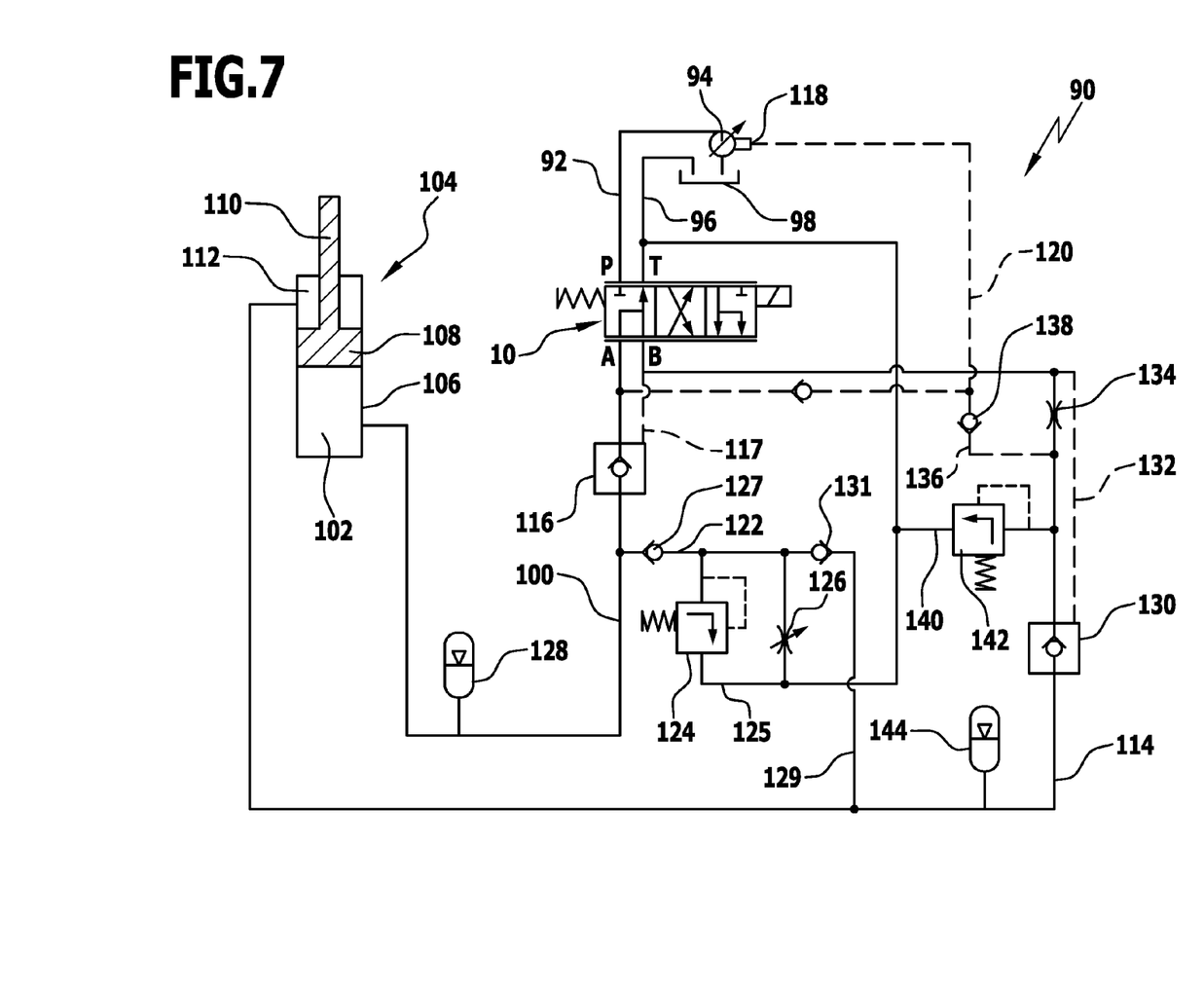
FIG. 7 shows a circuit diagram of a hydropneumatic suspension system according to the invention, with a hydraulic cylinder and a proportional directional control valve according to FIG. 1.

The proportional directional control valve 10 is particularly suited for use in a hydropneumatic suspension system, as illustrated in FIG. 7 and designated overall by reference numeral 90. In this suspension system, the above-described proportional directional control valve 10 is used, the pressure port P of which is connected to a load-sensing pump 94 via a pressure supply line 92, and the tank port T of which is connected to a reservoir 98 via a return line 96.

In the hydropneumatic suspension system 90, the first working port A of the proportional directional control valve 10 is connected to the piston chamber 102 of a hydraulic cylinder 104 via a first working line 100. The hydraulic cylinder 104 has a cylinder body 106 that is divided by a piston 108 having a piston rod 110 into the above-mentioned piston chamber 102 and an annular chamber 112 that encircles the piston rod 110 in the peripheral direction. The annular chamber 112 is in flow connection with the second working port B via a second working line 114. A first releasable check valve 116 is connected into the first working line 100. In the illustrated exemplary embodiment, the first check valve 116 is hydraulically releasable in dependence on the pressure prevailing in the second working line 114. For this purpose, a control input of the first check valve 116 is connected to the second working port B via a first valve control line 117.

The load-sensing pump 94 has a control port 118 that is in flow connection with the first working line 100 upstream from the first check valve 116 via a pump control line 120.

A pressure-limiting line 122 that runs to a hydraulically controllable pressure relief valve 124 branches off from the first working line 100 downstream from the first check valve 116. The pressure relief valve 124 is connected to a tank line 125 that is connected to the return line 96. A throttle element 126 is connected in parallel with the first pressure relief valve 124. A check valve 127 that opens in the direction toward the first pressure relief valve 124 is connected into the pressure-limiting line 122. A line 129 branches off from the pressure-limiting line 122 upstream from the first pressure relief valve 124, which line connects the pressure-limiting line 122 to the second working line 114 and into which another check valve 131 is connected which opens in the direction toward the pressure-limiting line 122.

A first hydraulic accumulator 128 is connected to the first working line 100 downstream from the first check valve 116.

A second releasable check valve 130 is connected into the second working line 114. In the illustrated exemplary embodiment, the second check valve 130 is hydraulically releasable in dependence on the pressure prevailing in the second working line 114 upstream from the second check valve 130. For this purpose, a control input of the second check valve 130 is connected, via a second valve control line 132, to the region of the second working line 114 that is located upstream from the second check valve 130.

A throttle element 134 is connected into the second working line 114 upstream from the second check valve 130, and in the region between the throttle element 134 and the second check valve 130, a control line 136 branches off from the second working line 114, which control line runs to the pump control line 120 and into which another check valve 138 is connected which opens in the direction toward the pump control line 120.

In the region between the throttle element 134 and the second releasable check valve 130, the second working line 114 is connected to the tank line 125 via a second pressure-limiting line 140. A second hydraulically controllable pressure relief valve 142 is connected into the second pressure-limiting line 140.

A second hydraulic accumulator 144 is connected to the second working line 114 downstream from the second releasable check valve 130.

The hydraulic cylinder 104 in combination with the two hydraulic accumulators 128, 144 forms a hydropneumatic spring. The hydraulic cylinder 104 can be disposed in a known manner between spring-loaded and nonspring-loaded masses, for example, of a vehicle or a machine installation.

A change in the relative position of the spring-loaded and nonspring-loaded masses can be counteracted by feeding and discharging hydraulic fluid to/from the piston chamber 102 and the annular chamber 112. The magnetic coil 18 of the proportional directional control valve 10 can be appropriately controlled by means of an electrical control unit which is known per se and therefore is not illustrated in the drawing for the sake of clarity.

In a first switching position of the proportional directional control valve 10, the working ports A and B are connected to the reservoir 98 via the tank port T and are thus depressurized, and the flow connections between the piston chamber 102 and the first working port A and between the annular chamber 112 and the second working port B are interrupted. The load-sensing pump 94 operates in standby mode in this switching position of the proportional directional control valve.

The control piston 16 of the proportional directional control valve 10 can be moved into a second switching position by suitable electrical activation of the magnetic coil 18. In this switching position, the flow connection between the first working port A and the tank port T is maintained; however, the second working port B is connected to the pressure port P so that the control port 118 can be acted on by pressure via the second working line 114, the control line 136, and the pump control line 120. As a result, the delivery rate and thus the output pressure of the load-sensing pump increase until the second releasable check valve 130 opens and hydraulic fluid can thus be fed to the annular chamber 112, limited by the second pressure relief valve 142. At the same time, the control input of the first releasable check valve 116 is also acted on by the pressure prevailing at the second working port B. As a result, the first check valve 116 opens and hydraulic fluid can thus drain from the piston chamber 102 to the reservoir 98 via the first working line 100, the first working port A, and the tank port T. As a result, the piston rod 110 is retracted and the relative position of the spring-loaded masses is lowered.

The piston rod 110 can be raised by feeding pressurized hydraulic fluid to the piston chamber 102 and to the annular chamber 112. For this purpose, the control piston 16 is moved by the magnetic coil 18 into its third switching position in which both working ports A and B are in flow connection with the pressure port P. In addition to the flow connection between the pressure port P and the second working port B that is already established in the second switching position, a flow connection is thus also established between the pressure port P and the first working port A. As a result, pressure builds up upstream from the releasable check valve 116, and at the same time is transmitted via a check valve to the pump control line 120 and thus to the control port 118 of the pump 94. The pump 94 thus increases its output pressure until there is sufficient pressure that hydraulic fluid can flow through the hydraulically releasable check valve 116 and thus can reach the piston chamber 102 via the first working line 100. At the same time, the flow connection between the pressure port P and the second working port B is also open, and hydraulic fluid is supplied to the annular chamber 112, as already explained above. Since the surface area of the piston 108 that is acted on by the pressure prevailing in the piston chamber 102 is larger than the surface area that is acted on by the pressure prevailing in the annular chamber 112, this results in extension of the piston rod 110 and therefore raising of the relative position of the spring-loaded masses. In the process, hydraulic fluid can drain from the annular chamber 112 to the tank line 125 via the released check valve 130 and the second pressure relief valve 142, and from the tank line to the reservoir 98.

The proportional directional control valve 10 thus allows speed-adjustable position control of the suspension cylinder 104 in a cost-effective manner, whereby only a single magnetic coil 18 has to be acted on with control current by an electrical control unit.

What is claimed is:

1. A proportional directional control valve for controlling a hydraulic consumer, comprising:
    a housing comprising a pressure port for feeding pressurized hydraulic fluid from a pressure medium source,
    a tank port for discharging the hydraulic fluid to a reservoir,
    a first and a second working port for connecting to the hydraulic consumer,
    a control element that is movably held in the housing, and
    a single actuator for moving the control element,
    the control element, in dependence on its position relative to the housing, enabling different flow paths between the first and the second working ports and the pressure port and the tank port, and flow cross-sections of the flow paths being changeable in a continuously variable manner in dependence on an adjustment travel of the control element,
    the control element, starting from a first switching position in which both the first and the second working ports are connected to the tank port, being movable by means of the actuator via a second switching position that directly follows the first switching position, into a third switching position that directly follows the second switching position,
    wherein:
    by moving the control element from the first switching position via the second switching position into the third switching position, the first and the second working ports are successively disconnected from the tank port and connected to the pressure port, and
    pressure forces of the hydraulic fluid acting on the control element in a direction of movement of the control element and counter to the direction of movement of the control element cancel each other out in all switching positions of the control element.

2. The proportional directional control valve according to claim 1, wherein the control element is linearly movable.

3. The proportional directional control valve according to claim 1, wherein the actuator is electrically activatable.

4. The proportional directional control valve according to claim 1, wherein the control element is successively movable against a resiliently elastic restoring force into the different switching positions, by means of the actuator.

5. A hydraulic circuit comprising:
    a hydraulic cylinder that has a cylinder body,
    a piston that delimits a piston chamber disposed in an interior of the cylinder body,
    a proportional directional control valve, the proportional directional control valve comprising:
        a housing comprising a pressure port for feeding pressurized hydraulic fluid from a pressure medium source,
        a tank port for discharging the hydraulic fluid to a reservoir,
        a first and a second working port for connecting to the hydraulic cylinder,
        a control element that is movably held in the housing, and
        a single actuator for moving the control element,
        the control element, in dependence on its position relative to the housing, enabling different flow paths between the first and the second working ports and the pressure port and the tank port, and flow cross-sections of the flow paths being changeable in a continuously variable manner in dependence on an adjustment travel of the control element,
        the control element, starting from a first switching position in which both the first and the second working ports are connected to the tank port, being movable by means of the actuator via a second switching position that directly follows the first switching position, into a third switching position that directly follows the second switching position, and
    wherein:
    by moving the control element from the first switching position via the second switching position into the third switching position, the first and the second working ports are successively disconnected from the tank port and connected to the pressure port, and
    pressure forces of the hydraulic fluid acting on the control element in a direction of movement of the control element and counter to the direction of movement of the control element cancel each other out in all switching positions of the control element,
    the first working port is in flow connection with the piston chamber via a working line, and
    a check valve is connected into the working line, the check valve opening in a direction toward the piston chamber and being releasable in dependence on a pressure prevailing at the second working port of the directional control valve.

6. The hydraulic circuit according to claim 5, wherein the check valve is hydraulically releasable.

7. The hydraulic circuit according to claim 5, wherein:
    the pressure port of the proportional directional control valve is in flow connection with a load-sensing supply system comprising the pressure medium source, and
    a valve is connected into the working line upstream from the check valve, which valve, in dependence on a flow direction of the hydraulic fluid in the working line, enables a flow connection between the working line and a control input of the load-sensing supply system.

8. A hydropneumatic suspension system for variable suspension loads, comprising:
    a hydraulic cylinder comprising a cylinder body, an interior of the cylinder body being divided into a piston chamber and an annular chamber by a piston having a piston rod that protrudes from the cylinder body, at least one first hydraulic accumulator that is connected to the piston chamber, at least one second hydraulic accumulator that is connected to the annular chamber, and a proportional directional control valve, the proportional directional control valve comprising:

a housing comprising a pressure port for feeding pressurized hydraulic fluid from a pressure medium source, a tank port for discharging the hydraulic fluid to a reservoir, a first and a second working port for connecting to the hydraulic cylinder, a control element that is movably held in the housing, and a single actuator for moving the control element, the control element, in dependence on its position relative to the housing, enabling different flow paths between the first and the second working ports and the pressure port and the tank port, and flow cross-sections of the flow paths being changeable in a continuously variable manner in dependence on an adjustment travel of the control element, the control element, starting from a first switching position in which both the first and the second working ports are connected to the tank port, being movable by means of the actuator via a second switching position that directly follows the first switching position, into a third switching position that directly follows the second switching position, and wherein:

by moving the control element from the first switching position via the second switching position into the third switching position, the first and the second working ports are successively disconnected from the tank port and connected to the pressure port; and pressure forces of the hydraulic fluid acting on the control element in a direction of movement of the control element and counter to the direction of movement of the control element cancel each other out in all switching positions of the control element, the first working port of the proportional directional control valve is in flow connection with the piston chamber via a first working line, the second working port of the proportional directional control valve is in flow connection with the annular chamber via a second working line, a first releasable check valve that opens in a direction toward the piston chamber is connected into the first working line, and a second releasable check valve that opens in a direction toward the annular chamber is connected into the second working line.

9. The hydropneumatic suspension system according to claim 8, wherein at least one of the first releasable check valve or the second releasable check valve is hydraulically releasable.

10. The hydropneumatic suspension system according to claim 8, wherein the first releasable check valve is releasable in dependence on a pressure prevailing at the second working port of the proportional directional control valve.

11. The hydropneumatic suspension system according to claim 8, wherein the second releasable check valve is releasable in dependence on a pressure prevailing at the second working port of the proportional directional control valve.

* * * * *

UNITED STATES PATENT AND TRADEMARK OFFICE
CERTIFICATE OF CORRECTION

PATENT NO.         : 9,505,288 B2
APPLICATION NO.    : 14/187650
DATED              : November 29, 2016
INVENTOR(S)        : W. Bauer Page 1 of 1

It is certified that error appears in the above-identified patent and that said Letters Patent is hereby corrected as shown below:

On the Title Page

The Assignee is corrected to read:
(73) Assignee: FSP Fluid Systems Partners Holding AG, Baar (CH)

In the Specification

Column 1, Lines 6-11:
"BACKGROUND OF THE INVENTION
This application claims the benefit of German patent application number 10 2013 102 069.0 filed on Mar. 1, 2013, which is incorporated herein by reference in its entirety and for all purposes."

Should read:
-- This application claims the benefit of German patent application number 10 2013 102 069.0 filed on Mar. 1, 2013, which is incorporated herein by reference in its entirety and for all purposes.

BACKGROUND OF THE INVENTION --

In the Claims
Column 14, Line 3: "5. A hydraulic circuit comprising:"

Should read:
-- 5. A hydraulic circuit, comprising: --

Column 15, Lines 31-33:
"switching
position, into a third switching position that directly follows the second switching position, and"

Should read:
        -- switching position, into a third switching position that directly follows the second switching position, and --

Signed and Sealed this
Thirty-first Day of January, 2017

Michelle K. Lee
*Director of the United States Patent and Trademark Office*